UNITED STATES PATENT OFFICE.

HARRY R. YOUNG, OF CATASAUQUA, PENNSYLVANIA.

BOILER COMPOUND.

No. 913,606.  Specification of Letters Patent.  Patented Feb. 23, 1909.

Application filed August 29, 1908. Serial No. 450,909.

*To all whom it may concern:*

Be it known that I, HARRY R. YOUNG, a citizen of the United States of America, and a resident of Catasauqua, county of Lehigh, and State of Pennsylvania, have invented a certain new and Improved Boiler Compound, of which the following is a specification.

My invention relates to an improved boiler compound, the function of which is the purification of feed water, the cleansing of the boiler, and the keeping the same free from scale.

The base of the compound, *i. e.*, the principal ingredient therein, is soapstone. To this base, I add a small quantity of other materials which may be varied in accordance with the analysis of the water to be purified. I find that a good all-round solution for general purposes comprises 80% powdered soapstone, 18% of some alkali, such as carbonate of soda, and 2% brown sugar. In some cases 2 or 2½% lime may be added to good advantage. These ingredients are first mixed together in powdered form and are then mixed in hot or cold water, the wet mixture being finally fed into the feed water line of the boiler. I preferably employ about 2 lbs. of the dry mixture per 100 horse power in ten hours, the said 2 lbs. to be mixed in two or three gallons of water and fed into the boiler twice a day. When first commencing to use the compound, a slightly larger quantity may be employed say about 2½ lbs per 100 horse power in ten hours. This larger amount may be employed every day for say, the first thirty days, and thereafter the first mentioned quantity will be found to be sufficient.

I find that a mixture of this character will purify the water, clean all the scale out of the boiler, and will keep the boiler clean.

Instead of, or as well as, using the compound in the feed water in the manner above mentioned, I may, if desired, filter the water through a bed of soapstone. If the soapstone is used as a filter bed, it will preferably be employed in the rock form rather than powdered.

What I claim is:

1. A boiler compound comprising soap stone and sugar.

2. A boiler compound comprising soap stone, an alkali, and sugar.

3. A boiler compound comprising powdered soap stone, carbonate of soda, and sugar.

4. A boiler compound comprising a comparatively large quantity of powdered soapstone, a comparatively small quantity of an alkali, and a much smaller quantity of brown sugar.

5. A boiler compound comprising about 80% of powdered soapstone, about 18% carbonate of soda, and about 2% brown sugar.

HARRY R. YOUNG.

Witnesses:
WILLIAM J. MCBRIDE,
FRANK SAIRLAY.